April 23, 1968      C. C. LEACH      3,379,190

BARBECUE COOKING UNIT WITH VERTICALLY MOVABLE FIREBOX SUPPORT

Filed Sept. 12, 1966      2 Sheets-Sheet 1

INVENTOR
CHARLES C. LEACH
BY Bedell & Burgess
ATTORNEYS

April 23, 1968
C. C. LEACH
3,379,190
BARBECUE COOKING UNIT WITH VERTICALLY MOVABLE FIREBOX SUPPORT
Filed Sept. 12, 1966
2 Sheets-Sheet 2
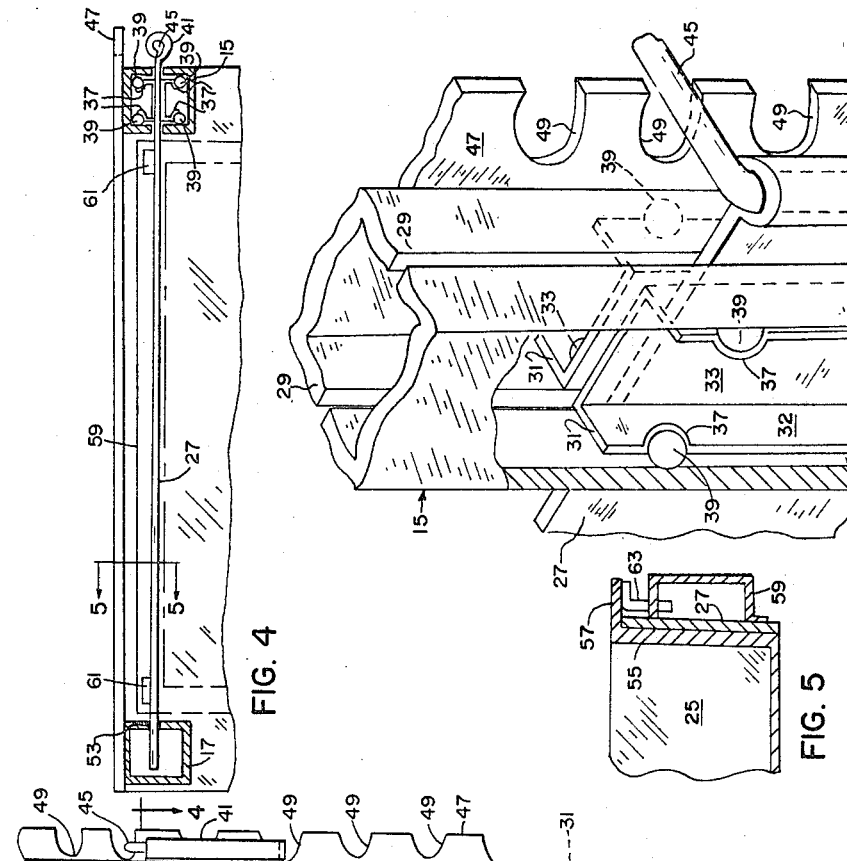
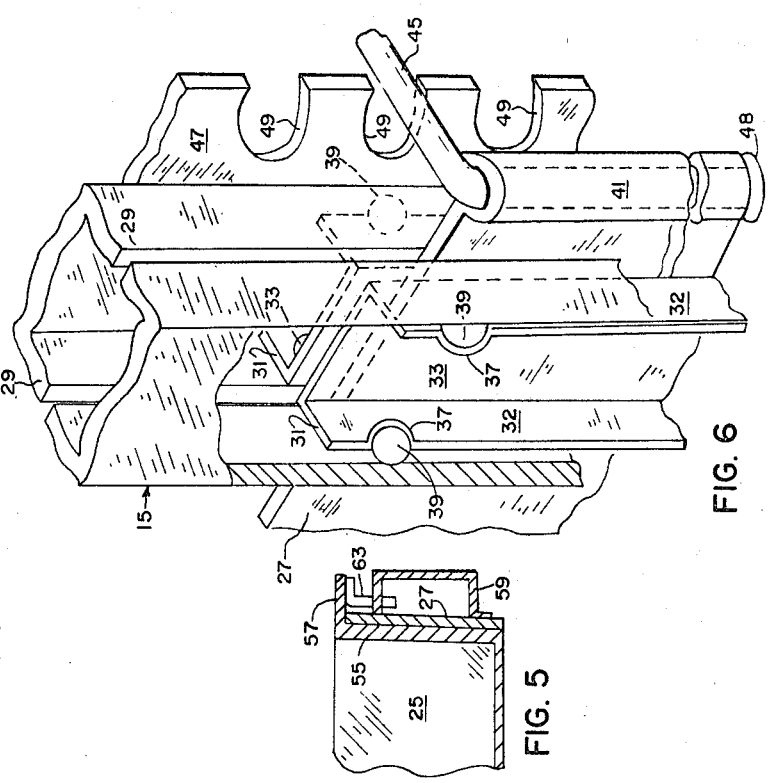
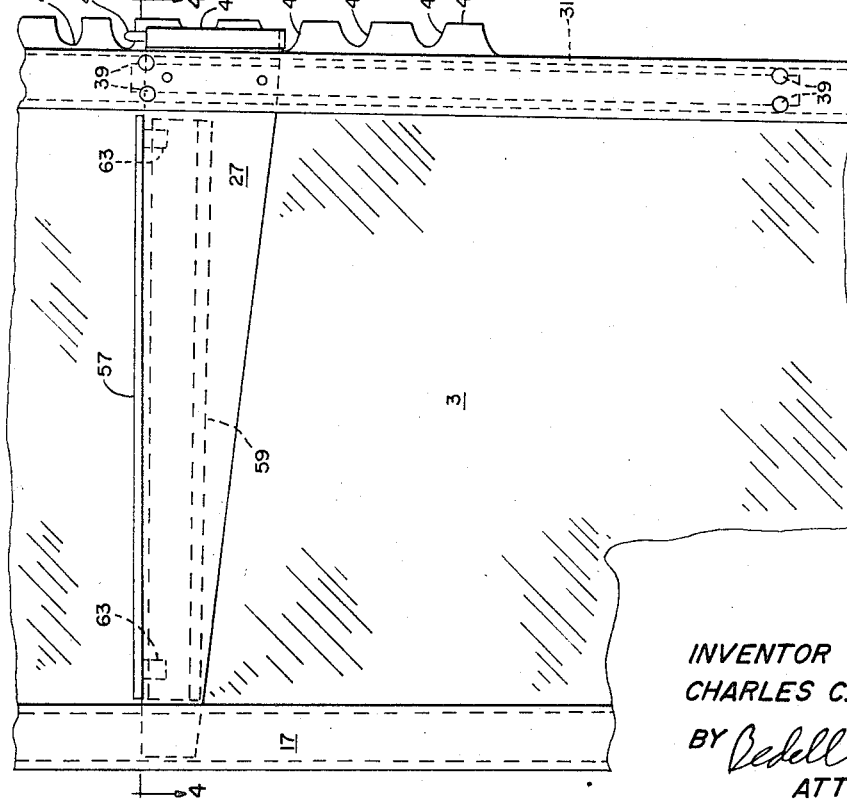
INVENTOR
CHARLES C. LEACH
BY Bedell & Burgess
ATTORNEYS

United States Patent Office 3,379,190
Patented Apr. 23, 1968

---

3,379,190
BARBECUE COOKING UNIT WITH VERTICALLY MOVABLE FIREBOX SUPPORT
Charles C. Leach, University City, Mo., assignor to Glaser Products Corp., St. Louis, Mo., a corporation of Delaware
Filed Sept. 12, 1966, Ser. No. 578,636
10 Claims. (Cl. 126—25)

The invention relates to barbeque cooking units and consists particularly in means for providing a vertically movable cartilever support for the fireboxes of such units.

It is an object of the invention to provide a barbecue cooking unit with two separate fireboxes each selectively movable to a different height so as to permit cooking two different kinds of meat simultaneously.

It is a further object to provide a cantilever support for each of the fireboxes from the sides of the unit.

A further object is to provide means for easily raising and lowering the fireboxes without handling them directly.

The foregoing and additional more detailed objects and advantages of the invention are achieved by the device, described hereinafter and illustrated in the accompanying drawings in which:

FIG. 3 is a vertical sectional view along line 3—3 of FIG. 2.

FIG. 4 is a horizontal sectional view along line 4—4 of FIG. 3.

FIG. 5 is a vertical sectional view along line 5—5 of FIG. 4.

FIG. 6 is a perspective view partly cut away of the vertically movable support means for the fireboxes.

Figure 1:
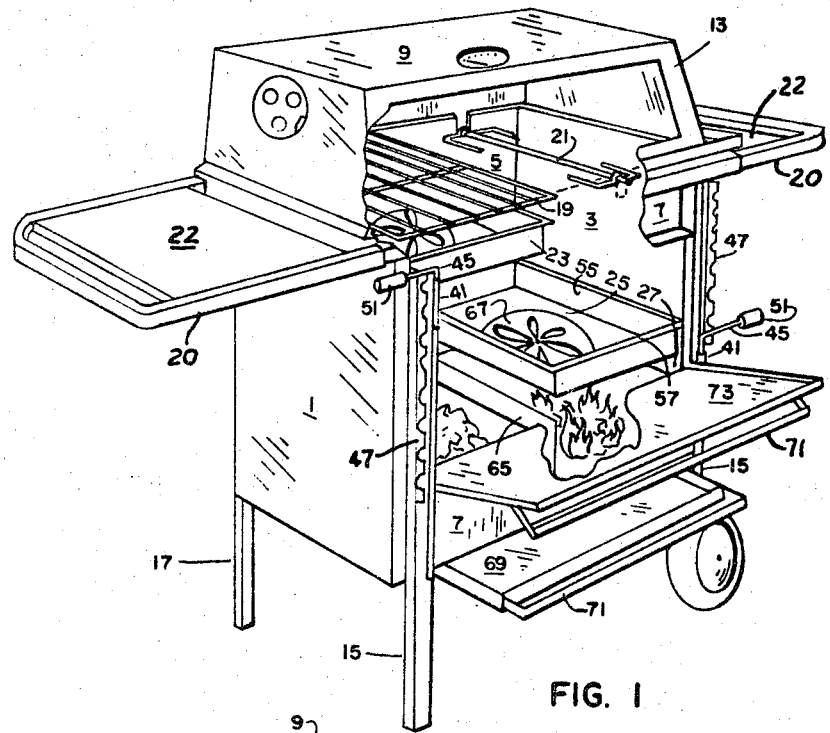
FIG. 1 is a perspective view of a barbecuing unit embodying the invention, partly cut away to show the relative positions of the fireboxes and other internal structure.
Figure 2:
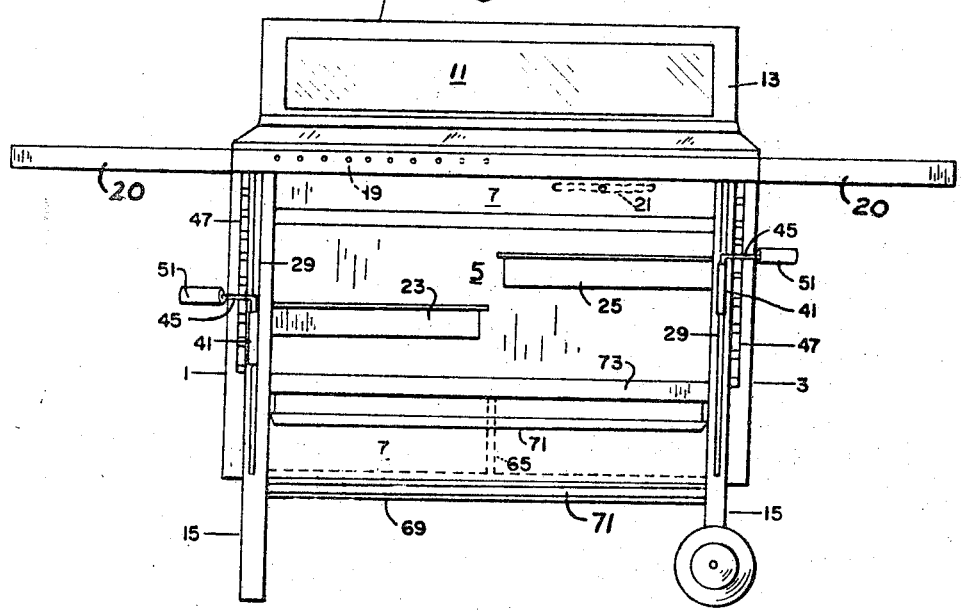
FIG. 2 is a front elevation of the unit illustrated in FIG. 1.

The unit consists essentially of a rectangular housing, comprising side walls 1 and 3, rear wall 5, and front wall 7. The housing is surmounted by a hood 9 rigidly connected to the upper margin of rear wall 5 and having a window 11 in its sloping front wall 13 to permit visual observation of the cooking. Adjacent the corners of the housing, upright posts 15, of polygonal, preferably square cross section, are secured to front wall 7, and generally similar posts 17 are secured to rear wall 5 adjacent its corners. Near the top of the housing, a horizontal cooking grid 19 is mounted, fully occupying the left half of the open top of the housing, and in the right half a spit 21 is mounted with its ends journaled in the forward and rear walls 7 and 5 of the housing. Wings 20 extending from each side of the housing support horizontal work surfaces 22.

In order that the fire can be maintained at selected positions with regard to the meat on the grid or on the spit, separate vertically movable fireboxes 23 and 25 are provided in vertical registry respectively with grid 19 and spit 21. So that fireboxes 23 and 25 may be vertically movable, they are supported at their sides adjacent side walls 1 and 3, respectively, of the housing by means of plate-like cantilever arms 27 which are vertically movable in the housing. For supporting cantilever arms 27 for vertical movement, box section front posts 15 are formed with vertical slots 29 in their front and rear webs, through which cantilever arms 27 extend. Within posts 15, channel members 31 are secured by means of their webs 33, in back-to-back relation, to the opposite surfaces of arms 27. Channel members 31 extend upwardly a slight distance higher than the upper edge of plates 27, and their flanges are formed along their vertical margins near their upper ends with substantially quarter-spherical embossures 37, in which are freely seated ball bearings 39, which engage the inside surfaces of the webs of posts 15 adjacent the corners thereof. Similar embossures are formed adjacent the lower ends of channels 31 and additional ball bearings 39 are seated in them, thus providing a vertical arm of substantial length opposing tendencies of cantilever arms 27 to tilt from their normal horizontal position.

The ends of cantilever plates 27 which protrude from the outer webs of posts 15 are bent as at 41 to form substantially cylindrical loops, in which are rotatably mounted vertical arms of crank 45. Secured to the outer side of posts 15 are bars 47 formed with substantially horizontal notches 49, and for maintaining cantilever plates 27 and with them fireboxes 25 at any selected level, the horizontal portions of cranks 45 are seated in an appropriate notch 49 in plate 47, the upset lower end 48 of crank 45 maintaining plates 47 at the desired height. To facilitate manual operation of cranks 45, they are provided with handles 51 of low thermal conductivity. By swinging either crank 45 out of the notches 49, the crank can be used to raise or lower cantilever arm 27 and firebox 23 or 25 mounted thereon, vertical movements of the firebox and cantilever arm being facilitated by the rolling engagement between ball bearings 39 and the interior surfaces of the posts 15, the long vertical spacing of ball bearings 39 opposing tendencies of the cantilever plates 27 to tilt relative to posts 15 as a result of the weight of fuel in the fireboxes. To stabilize cantilever plates 27 horizontally, rear posts 17 are slotted along their front surfaces and the ends of cantilever plates 27 remote from posts 15 are extended into these slots 53 and are freely movable vertically therein.

Fireboxes 23 and 25 are shallow rectangular fans, the peripheral wall 55 of which is surmounted by an outwardly extending flange 57. To further rigidify cantilever plates 27 and to provide means for mounting fireboxes 23 and 25 on them, hat section members 59 are secured, as by welding, to the outer surfaces of plates 27 along the upper margins thereof. A pair of spaced small elongated slots 61 are formed in the upper horizontal flange of hat section member 59 and the adjacent horizontal flange of the firebox 25 is formed with a similarly spaced pair of depending tabs 63 so that the fireboxes 23 and 25 can be secured on cantilever arms 27 by having their side walls 55 abutting the inside surfaces of cantilever arms 27, their top flange 57 seated on the upper edge of cantilever arms 27 and projection 63 extended into slots 61 in hat section members 59. With this arrangement fireboxes 25 can easily be detached from the cantilever plates by hand when cool. The lower portion of the housing defined by end walls 1 and 3, front and rear walls 5 and 7 forms two separate fire building sections separated from each other by means of intermediate wall 65, positioned intermediate end walls 1 and 3 and vertically aligned with the adjacent sides of firepans 23 and 25. The bottoms of fireboxes 23 and 25 are provided with circular radially slotted draft devices 67, so that the charcoal in the fireboxes can be ignited by means of burning paper in the firebuilding sections, the draft being regulated thereafter by means of a poker or other tool. For removing ashes from the firebuilding sections the bottom wall is slidable, forming an ash drawer 69, provided with a handle 71 to facilitate insertion and retraction.

For building a fire and regulating it, the front of the unit is provided with a large access door 73 hinged to the housing along the horizontal upper margin of the lower portion of front wall 7 and adapted to swing from a closed vertical position to a nearly horizontal open position as shown in FIG. 1. Door 75 also has a suitable handle 71.

Operation of the device is as follows: If both sides of the unit are to be used, fireboxes 23 and 25 are positioned at a suitable height for placing in them desired amounts of charcoal by means of cranks 51 and dampers 67 are opened, vertical movement of cantilever arms 27 and the fireboxes being facilitated by the engagement of ball bearings 39 with the inner surfaces of posts 15. Again using arms 45, pans 23 and 25 are elevated to a sufficient height to permit placing wads of paper in the firebuilding units separated by intermediate walls 65, the paper is ignited, and firebox 23 and 25 are lowered substantially to the position of 25 in FIG. 1, so as to permit the burning paper to ignite the charcoal in the fireboxes. Fireboxes 23 and 25 are then elevated individually to whatever height is deemed most suitable for the type of food being cooked on their respective sides of the unit.

After the meat has been cooked and removed, fireboxes 23 and 25 can be lowered to the same level as door 73 and when cool they can be lifted out, after which ashes contained in them can be dumped and they can be cleaned out. Similarly ashes of the paper and other materials used to build the fire in the firebuilding sections at the bottom of the unit can be removed by withdrawing ash drawer 69. If it is desired to use only one side of the unit, for example, to roast a fowl on the spit 21, the operation would be as follows: Hood 9 would be raised and the fowl placed on the spit. Access door 73 would be opened and firebox 55 would be filled with charcoal, raised by means of lever 45 and cantilever plate 27 and the associated channels 31 and balls 39 to permit starting a paper fire in the firebuilding unit on the right hand side beneath firebox 25. With draft 67 open firebox 25 would again be lowered by means of arm 45 in the position shown in FIG. 1, until the charcoal became ignited, after which it might be raised any selected position, as desired, by means of crank 45.

The invention may be modified in various respects as will occur to those skilled in the art and the exclusive use of all modifications as come within the scope of the appended claims. is contemplated.

What is claimed is:

1. A cooking unit comprising a housing, food supporting means therein, a shallow firebox below said food supporting means, an upright hollow member of polygonal cross section secured to said housing and having coplanar vertical slots in its opposite webs, a plate-like member within said housing and extending through said vertical slots, with one end protruding from said hollow member outwardly of said housing, a vertically-elongated element secured to said plate-like member within said hollow member and mounting vertically-spaced groups of ball bearings engaging the interior corners of said posts, and means carried by said plate-like member for selectively positioning the latter vertically, and means securing said firebox to said plate-like member.

2. A cooking unit according to claim 1, in which said positioning means comprises a crank pivotally secured on a vertical axis to an end of said plate-like member and having a substantially horizontal arm, structure forming vertically spaced horizontal surfaces rigid with said posts, said horizontal arm being rotatable into and out of engagement with said horizontal surfaces for moving said plate-like member and said firebox between selected vertical positions corresponding to said horizontal surfaces and fixing said plate-like member and supported firebox in any of said positions.

3. A cooking unit according to claim 1 in which said housing is formed with a vertical slot coplanar with said first-named vertical slots and spaced horizontally therefrom and the end portion of said plate-like member remote from said hollow member is vertically movably received in said last-named slot.

4. A cooking unit according to claim 1 in which said housing is rectangular in plan, having a front and rear wall and transversely spaced apart side walls, there being a pair of said hollow members of square cross-section positioned respectively adjacent the intersections of said front wall and said side walls with the planes of their slots parallel to the adjacent side walls, there being a pair of said plate-like members, of said vertically elongated members with groups of ball bearings, and of said vertical positioning means similarly associated respectively with both said hollow members, there being also a pair of said fireboxes in side by side relation within said housing, each secured respectively to one of said plate-like members.

5. Vertically movable cantilever support means comprising a hollow upright member of polygonal cross-section having axially extending coplanar slots in its opposite webs, a plate-like member of vertically-elongated cross-section extending through said slots, vertically-elongated structure of substantially greater height than said plate-like members rigidly secured to the latter within said hollow member and mounting groups of ball bearings engaging the interior angles of said hollow member, said groups being spaced apart a substantial distance vertically whereby to provide a long vertical arm opposing any tendency of said plate-like member to tip.

6. Vertically movable cantilever support means according to claim 5 in which said plate-like member is horizontally elongated in one direction from said hollow member.

7. Vertically movable cantilever support means according to claim 6 including structure spaced from said hollow member and having a vertical slot coplanar with said first named slots, the end portion of said plate-like member remote from said hollow member being vertically movably received in said last named slot.

8. Vertically movable cantilever support means according to claim 5, including cooperating means secured to said plate-like member and said hollow members for selectively positioning said plate-like member at various levels.

9. Vertically movable cantilever support means according to claim 8 in which said cooperating means comprises an element rigid with said hollow member and having a plurality of vertically spaced upwardly-facing surfaces and an element secured to said plate-like member for movement into and out of engagement with said horizontal surfaces.

10. Vertically movable cantilever support means according to claim 9 in which said plate-like member is formed with a vertical bearing at its end adjacent said hollow member and said element secured to said plate-like member is a crank with its one arm journalled in said bearing and its other arm extending non-vertically therefrom for rotation into and out of engagement with said horizontal surfaces.

References Cited

UNITED STATES PATENTS 3,121,386   2/1964   Persinger et al. _____ 126—25

FREDERICK KETTERER, *Primary Examiner.*